United States Patent

[11] 3,537,613

| [72] | Inventor | Henry W. Greer<br>Philadelphia, Pennsylvania |
|---|---|---|
| [21] | Appl. No. | 775,301 |
| [22] | Filed | Nov. 13, 1968 |
| [45] | Patented | Nov. 3, 1970 |
| [73] | Assignee | Smith Kline & French Laboratories<br>Philadelphia, Pennsylvania<br>a corporation of Pennsylvania |

[54] CAPSULE FEEDING APPARATUS
10 Claims, 9 Drawing Figs.

[52] U.S. Cl. .................................................. 221/68,
221/93, 221/178
[51] Int. Cl. ..................................................... B65g 1/10,
B65g 59/06, B65h 3/34
[50] Field of Search .......................................... 221/68, 93,
95, 175, 178; 198/52

[56] References Cited
UNITED STATES PATENTS

| 1,325,752 | 12/1919 | Pope .......................... | 221/93X |
| 2,890,557 | 6/1959 | Greer et al. .................... | 221/68X |
| 3,011,678 | 12/1961 | McClosky et al. ............. | 221/178X |

*Primary Examiner*—Evon C. Blunk
*Assistant Examiner*—Roger S. Gaither
*Attorney*—Busser, Smith and Harding ABSTRACT: Apparatus for feeding capsules from a supply thereof through a tube containing capsules arranged in end-to-end relationship and to capsule receiving holes in a rotating transfer wheel. A member is mounted at the discharge end of the capsule feeding tube adjacent the transfer wheel and is moved along with the wheel during a period when a gate is opened to permit transfer of the capsules from the tube to the capsule receiving holes in the transfer wheel.

INVENTOR
HENRY W. GREER
BY
ATTORNEYS

INVENTOR
HENRY W. GREER

BY Jesse Smith & Harding

ATTORNEYS

INVENTOR
HENRY W. GREER

ATTORNEYS

INVENTOR
HENRY W. GREER

BY Besse Smith + Hardy

ATTORNEYS

CAPSULE FEEDING APPARATUS

BACKGROUND OF THE INVENTION

This invention relates generally to the art of capsule feeding machines and more particularly to apparatus for feeding capsules from a tube containing the capsules in end-to-end relationship to capsule receiving holes in a rotating transfer wheel.

In the prior art capsule feeding machines, of which the machine disclosed in U.S. Pat. No. 2,890,557 is illustrative, the production rate is limited by the length of the capsule and the time required to transfer the capsule from a stationary position in the supply tube to a constantly moving transfer wheel. In these prior art machines, the relative motion between the transfer wheel and the stationary capsule in the discharge end of the capsule feeding tube had to be minimized to insure an effective transfer of the capsules from the tube to the moving transfer wheel. Accordingly, this serves to limit the production rate of the capsule feeding machine.

SUMMARY OF THE INVENTION

The present invention provides a capsule feeding apparatus which overcomes the limitations on the production rate of the capsule feeding apparatus of the prior art. Briefly stated, this is achieved by providing a movable member at the discharge end of the capsule feeding conduit means and means for moving this member with the transfer wheel for a period of rotation during which a gate means is actuated to release the capsules in the conduit means and allow them to drop into the capsule receiving holes in the transfer wheel.

Another feature of the invention relates to the provision of a gate means which frictionally engages the capsules at a side portion thereof, as opposed to the gate means of the prior art which completely close off the discharge end of the capsule feeding conduit means. Accordingly, a gate means in accordance with the invention has the advantage that the timing of the gate opening and gate closing is not as critical and the gate means is much easier to control.

DESCRIPTION OF THE PREFERRED EMBODIMENT

The capsule feeding apparatus in accordance with the invention is shown as incorporated in a capsule filling machine of the type shown in detail in said U.S. Pat. No. 2,890,557, such machine comprising means indicated generally at 10 for positioning successive capsules in end-to-end relation with the capsule body positioned forwardly. This capsule orienting means 10 is shown in detail in said prior patent and can be considered, for the purposes of this description, to consist of a capsule supply means.

The capsule orienting means 10 includes a plurality of discs 12 mounted on a rotating shaft 14 and having beveled peripheries. The discs 12 are spaced apart so as to receive capsules passing from the lowermost ends of a plurality of tubes 16. The spacing between the discs 12 is selected to permit the body portions of the capsules to fall between the discs while preventing the cap portions of the capsules from passing between the discs to thereby position the capsules with the body portion extending radially inwardly of the cap portion.

Figures 1, 2:
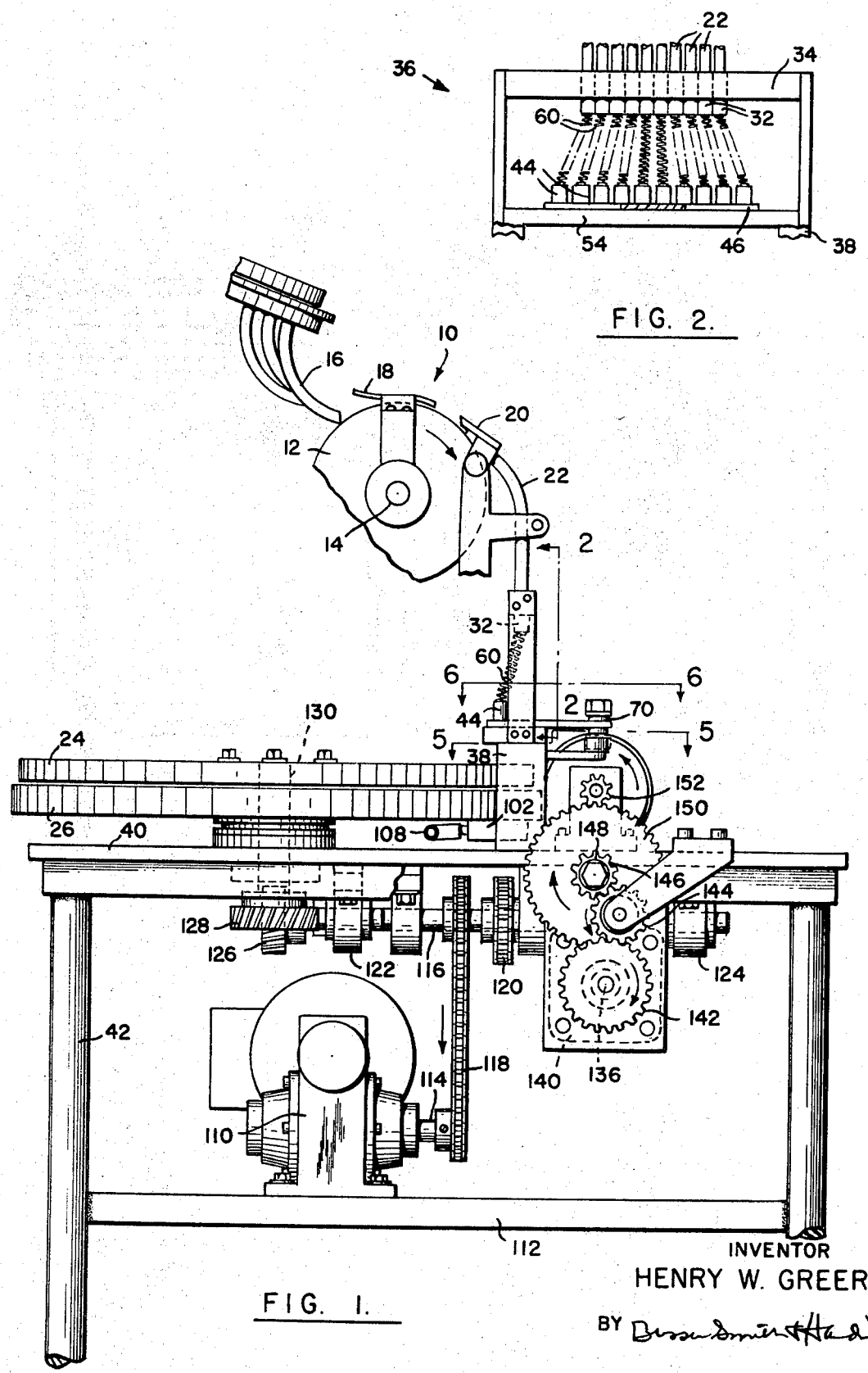
FIG. 1 is a side elevation of the apparatus in accordance with the invention.
FIG. 2 is a fragmentary sectional view taken generally on line 2-2 of FIG. 1.

The discs 12 rotate in the direction indicated by the arrow in FIG. 1 and successive capsules are carried by the rotating discs under a plate 18 which deflects the cap portions of the capsules downwardly or backwardly and causes the capsules to advance in a generally horizontal position therebeneath. The capsules advancing to the right as viewed in FIG. 1 pass with their leading or body ends between a pair of plates, the upper plate being indicated at 20, for entry into a plurality of tubes 22 with the body end of the capsule leading. Accordingly, the tubes 22 serve to supply a plurality of capsules in end-to-end relation. In other words, there is provided a plurality of adjacently arranged lines of capsules being conducted downwardly by the tubes 22.

There is provided a rotating, horizontal, disc-shaped wheel 24 positioned in spaced relation above a fixed disc 26. The wheel 24 rotates in the direction indicated by the arrows in the drawings and is provided with an annular array of circumferentially spaced holes 28 which are adapted to receive capsules delivered thereto in a vertical direction.

In the capsule filling machine in accordance with said patent the rotating wheel 24 serves to transfer the capsules to the capsule filling apparatus. However, this transfer operation forms no part of the present invention. The present invention relates to the means for feeding the capsules from the supply in the tubes 22 into the capsule receiving holes 28 in the rotating disc 24.

The capsule feeding apparatus in accordance with the invention comprises what may be termed a plurality of capsule feeding conduit means 30 extending from the lower ends of each of the tubes 22 to a location above and in alignment with the path of movement of the array of capsule receiving holes 28. Each of the conduit means serves to guide the capsules in end-to-end relation as they move downwardly and includes a fixed upper tube 32 positioned beneath the discharge end of the tubes 22 and arranged to receive capsules therefrom. The fixed tubes 32 are mounted on the horizontal crossbar 34 of a frame 36 supported on a support member 38 which rests on the base plate 40 of the machine, the base plate being supported on the vertical legs 42. The bottom ends of the tubes 22 are also supported on this crossbar 34 in aligned relationship with the fixed tubes 32 of the conduit means 30.

Each of the conduit means 30 also includes a lower tube 44 supported on a cam-actuated movable member 46. Also secured to the movable member 46 is an arcuate shoe 48 having vertical bores 50 aligned with the tubes 44 and receiving vertical tubes 51. The shoe 48 is contained in an arcuate guide opening 52 formed in a fixed horizontal plate 54 secured on the support members 38 which rest on the base plate 40. A bottom plate 56 secured to the horizontal plate 54 serves to hold the shoe 48 in the slot 52 and also provides an arcuate guide slot for the tubes 51 contained in arcuate shoe 48. The cam-actuated member 46, the bottom tube 44, the shoe 48 and the tubes 51 are secured together for conjoint movement in an arcuate path aligned with the arcuate path of movement of the capsule receiving openings 28 in the rotating wheel 24.

Figure 3:
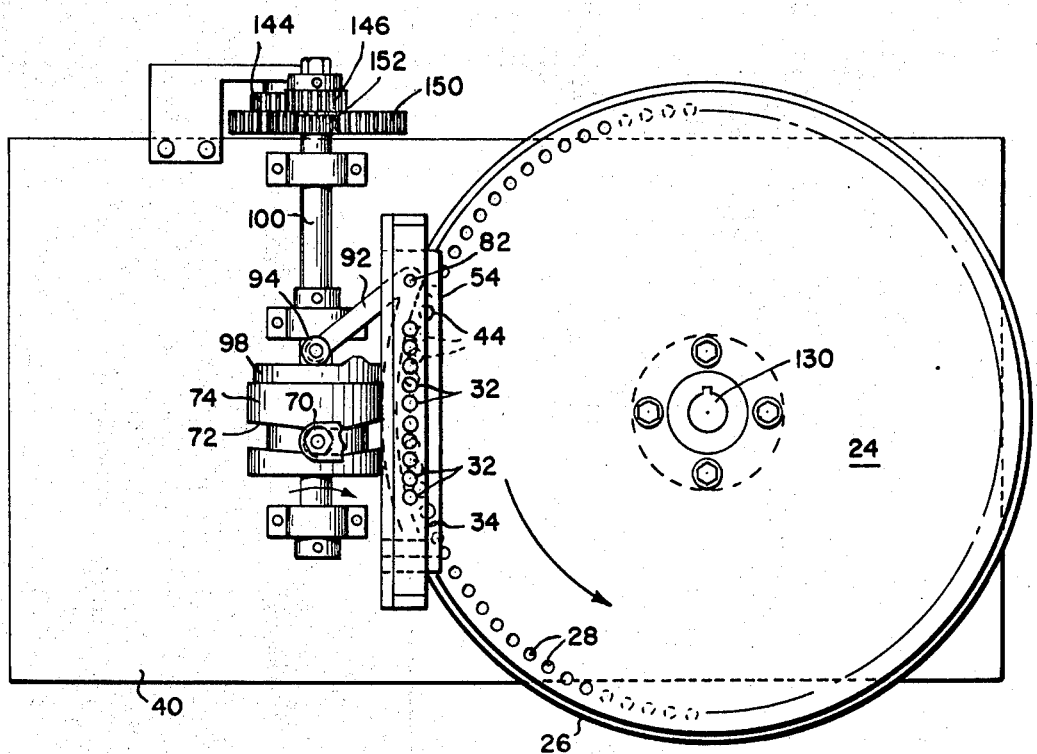
FIG. 3 is a top view of the apparatus in accordance with the invention.
Figure 4:
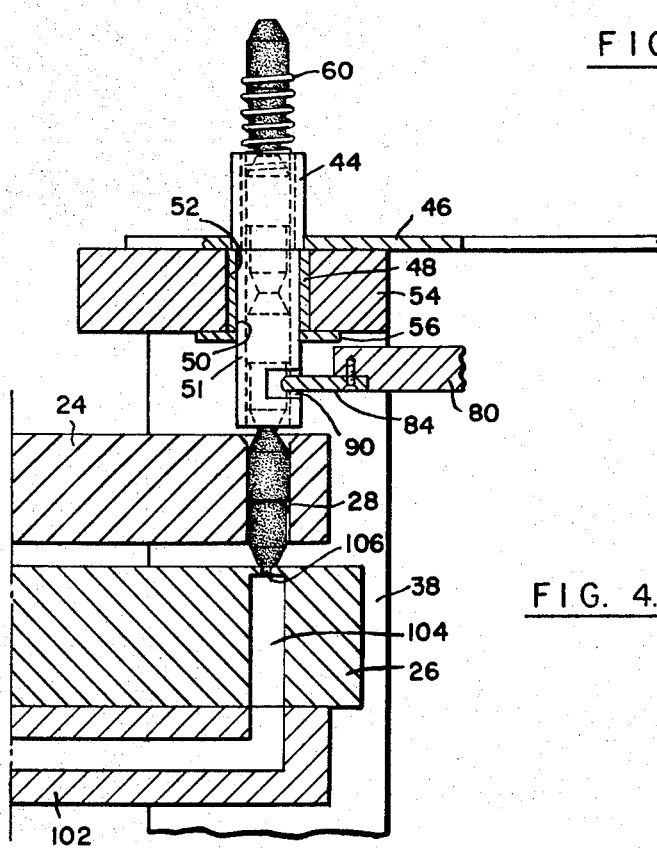
FIG. 4 is an enlarged fragmentary view of a detailed portion of the apparatus.
Figure 9:
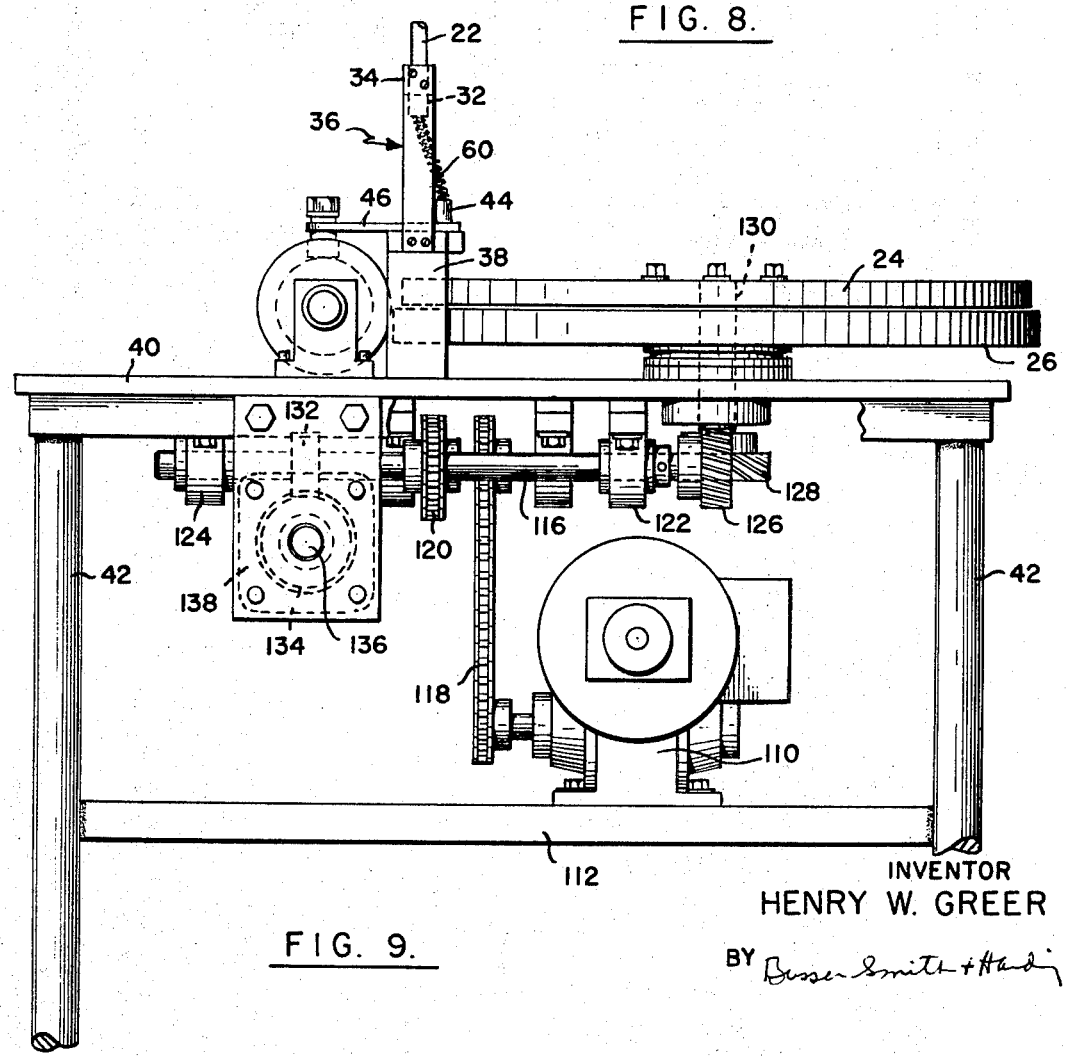
FIG. 9 is a side elevation illustrating the drive means for the apparatus.

Each of the conduit means also comprises a flexible spring wire tube 60 extending vertically from the lower end of the upper tube 32 into the upper end of the lower tube 44 as is best shown in FIGS. 1, 4 and 9. It will be apparent that even though the upper tubes 32 are positioned in a straight line on the crossbar 34 as is shown in FIG. 3, and the lower tubes 44 are positioned in an arcuate arrangement, a proper interconnection is provided by means of the flexible spring wire tubes 60 which can accommodate a considerable amount of lateral deviation.

It will thus be apparent that each of the conduit means 30 provides a feed path for the capsules from the end of the tubes 22 through an upper fixed tube 32, through a flexible wire tube 60, through a movable tube 44 and through a tube 51 in the shoe 48 to a position at the top surface of the rotating wheel 24 in alignment with the path of movement of the capsule receiving openings 28.

Figures 5, 6:
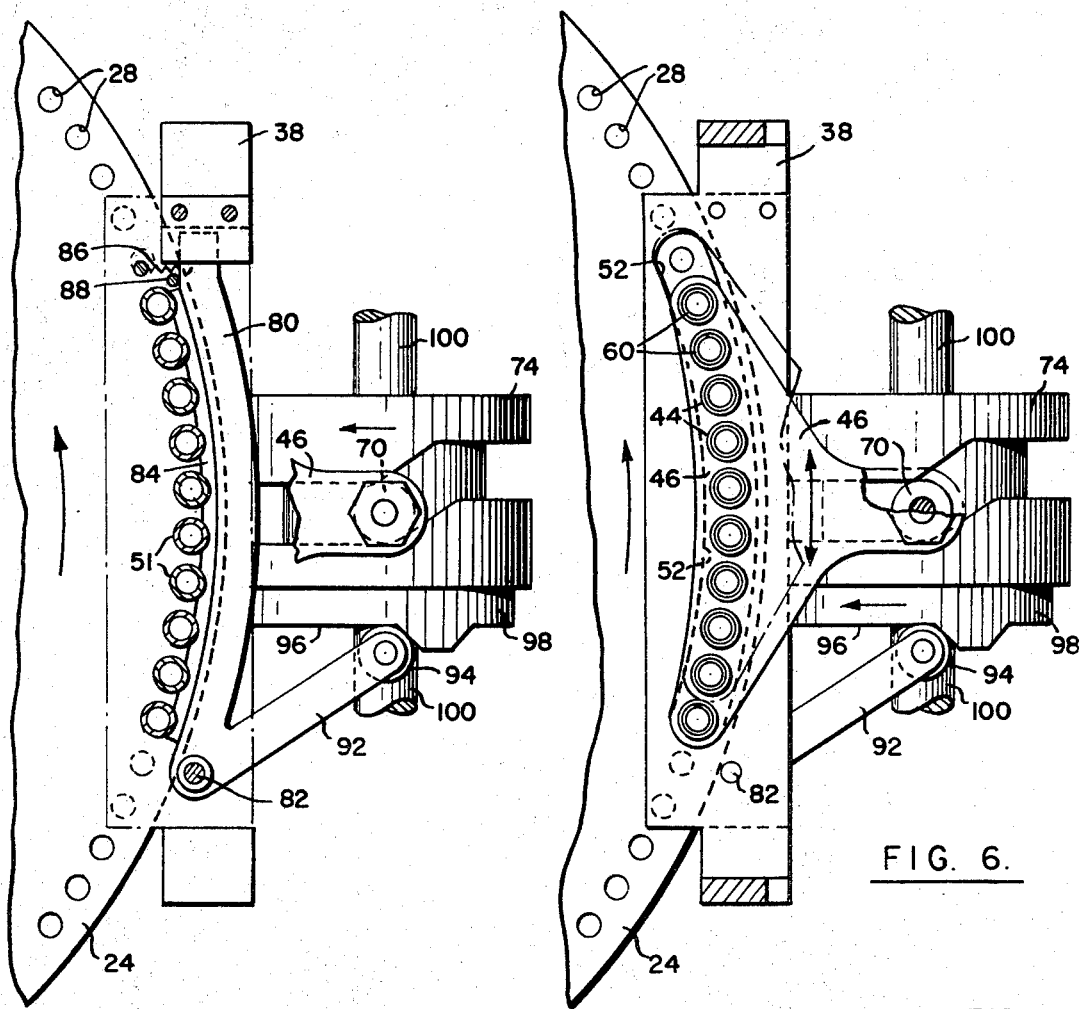
FIG. 5 is a section taken generally on line 5-5 of FIG. 1.
FIG. 6 is a section taken generally on line 6-6 of FIG. 1.

Means are provided for moving the lower ends of the conduit means along with the rotating wheel 24 during a period when the capsules may be dropped from the discharge ends of the conduit means into empty capsule receiving holes 28. To this end, the member 46 is provided with an arm portion extending outwardly from the tube holding portion and carrying a cam follower in the form of a roller 70. The roller rides in a cam groove 72 formed in the periphery of a cylindrical cam 74 as is shown in FIG. 6. The cam 74 is constructed to cause oscillation of the shoe 48 within the arcuate guide slot 52 in the plate 54 from the solid line position shown in FIG. 6 to the dotted line position of this FIG. The position of parts shown in solid lines in FIG. 6 may be termed the "zero" position and corresponds to this indication of FIG. 7 which shows the cam operation schematically. This FIG. shows that during a period of cam rotation from 0° to 36°, the cam 74 causes the movement of the shoe 40 from the zero position to the fully advanced position (shown in dotted lines in FIG. 6). Moreover, this movement is designed to correspond exactly to the rate of arcuate movement of the holes 28 in wheel 24 so that during this period the discharge ends of the conduit means 30 are in exact alignment with the capsule receiving openings 28 in the wheel 24 during this conjoint movement.

Figure 7:
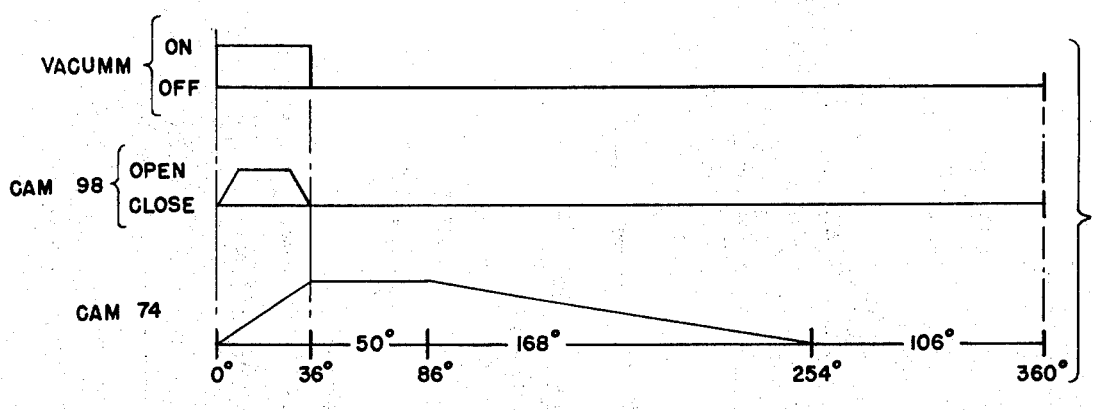
FIG. 7 is a schematic illustration of the operation of the cams and the vacuum means provided in the apparatus.

As shown in FIG. 7, the cam maintains the shoe 48 in the fully advanced position for 50° of cam rotation between 36° and 86°. The cam 74 then returns the shoe 48 to the zero position during the period of 86° to 254° of cam rotation and maintains the shoe 48 in this zero position for the remainder of the rotation of the cam to complete a full revolution.

It will be apparent that the conduit means 30 can accommodate this movement of its lower ends by reason of the flexibility provided by the flexible wire tubular portions 60 thereof.

A gate means is also provided for controlling the movement of the capsules from the discharge ends of the conduit means 30 into the capsule receiving holes 28 in the wheel 24. To this end, there is provided an arcuate arm 80 pivotally mounted on plate 54 at a pivot 82 and carrying an arcuate capsule holding blade 84. A spring 86 connected to the free end of the arm 80 biases the same in a counterclockwise direction about the pivot 82 as viewed in FIG. 7 into contact with a stop 88. By this arrangement, the spring 86 urges the holding blade 84 into contact with a side portion of the lowermost capsule in each of the tubes 51 of the shoe means 48. The holding blade extends through an opening 90 formed in each of the tubes 51 to contact the sides of each of the capsules contained within the lower portion thereof and to frictionally hold the same in position within the tubes 51.

The arcuate arm 80 is joined with another arm 92 extending therefrom and carrying a cam follower or roller 94 which rides on a cam surface 96 formed by the cylindrical cam 98 as shown in FIG. 7. The cam 98 is mounted on the same shaft 100 onto which cam 74 is mounted.

The cam surface 96 is formed to actuate the gate means to release the capsules during the period when the shoe 48 is moving along conjointly with the rotating wheel 24. To this end, the cam surface 96 is formed in the manner shown schematically in FIG. 7 which shows that during the first 36° of cam movement from the zero position, the cam means causes the arm 80 to pivot in a clockwise direction (as viewed in FIG. 5) about the pivot 82 during which pivotal movement the holding blade 84 is moved away from the capsules in the discharge end of tubes 51. Accordingly, the capsules are free to drop into the empty holes 28 in the wheel which are below the discharge end of the conduit means 30.

Vacuum means are provided to assist the transfer of the capsules from the discharge end of the conduit means into the empty capsule receiving openings in the rotating wheel 24. To this end, an air manifold 102 of arcuate formation is positioned below the stationary disc 26 in the region of the discharge ends of the conduit means 30. The air manifold 102 is provided with a plurality of vertically extending bores 104 which extend through the stationary disc 26 and terminate in small ports 106 in alignment with the arcuate path of movement of the capsule receiving holes 28 in the region beneath the discharge ends of the conduit means 30. The manifold 102 is connected to a suitable vacuum source by the conduit 108 shown in FIG. 1.

Suitable control means are provided to actuate the vacuum between the "off" and "on" position as shown schematically in FIG. 7. Thus, the vacuum is only turned on during what may be termed the transfer period when the capsules are released by the gate means and permitted to fall into an empty capsule receiving opening 28.

Figure 8:
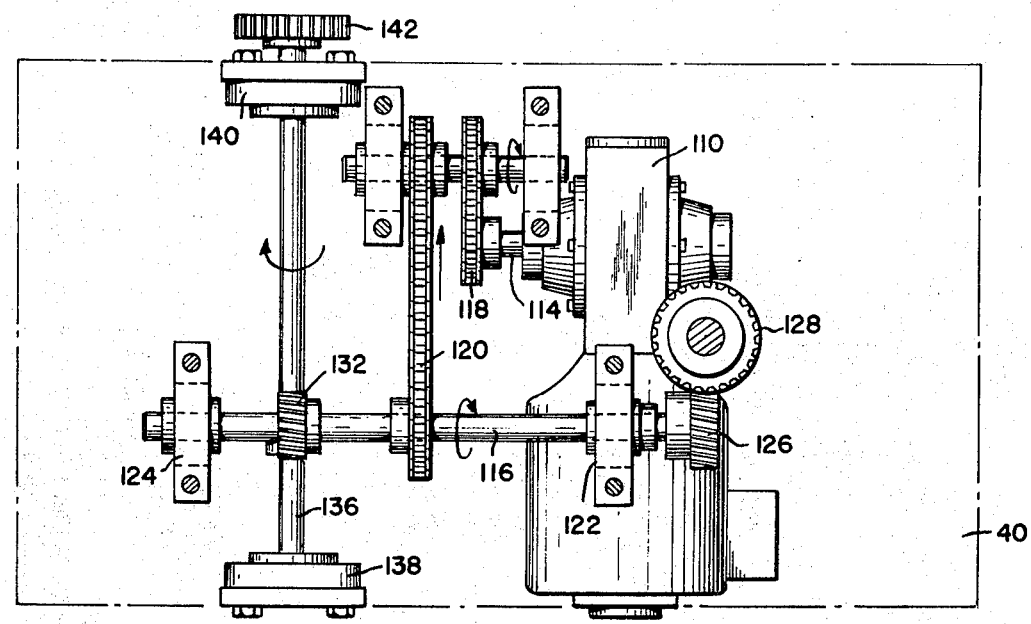
FIG. 8 is a plan view illustrating the drive means for the apparatus.

The drive mechanism for the apparatus includes a motor and speed reducer assembly 110 positioned on a plate 112 supported by the legs 42 below the base plate 10. The output shaft 114 of the assembly 110 drives a main drive shaft 116 through a pair of drive chains 118 and 120. The main drive shaft is supported on bearings 122 and 124 secured to the bottom side of base plate 40 as shown in FIG. 8. One end of the drive shaft 116 carries a helical gear 126 which drives a helical gear 128 secured to the vertically extending shaft 130 to which the rotating wheel 24 secured.

Another portion of the drive shaft 116 carries a helical gear 132 which drives a helical gear 134 secured to a shaft 136 supported on bearings 138 and 140. An extended end of the shaft 136 carries a gear 142 which rotates therewith and drives a gear 144. Gear 144 drives another gear 146 which in turn drives the shaft 148 carrying a gear 150 which drives a small gear 152 mounted on the end of the cam shaft 100. The direction of rotation of the various gears and shafts is shown by the arrows in FIGS. 1, 3, 8 and 9.

The drive means is, of course, designed with the proper drive ratio to correspond with the number of capsule receiving holes 28 in the wheel 24 and the number of capsule feeding conduits 30. Assuming, as is shown in the drawings, that there are 10 capsule feeding conduits 30, the drive ratio is designed so that the cams 74 and 98 will made one revolution for each time that it takes to drive 10 holes past the capsule transfer station beneath the discharge ends of the conduit means 30. This design of the drive means is, of course, easily achieved by those skilled in the art.

It will be apparent that the specific details of drive means forms no part of the invention and that various drive means with the above-discussed drive ratio may be utilized.

In describing the operation of the apparatus in accordance with the invention, let it be assumed that the parts are initially in the condition shown in FIGS. 5 and 6 with the cams 74 and 98 in the zero position. In this condition of the parts, the gate means is closed and the holding blade 90 is in contact with the sides of the capsules in the discharge tubes to hold them in the conduit means 30. The wheel 24 has rotated to a position in which 10 empty capsule receiving holes 28 have just come into alignment with the tubes 51 at the discharge ends of the 10 conduit means 30.

The next phase of the operation involves the transfer of the capsules from the discharge ends of the conduit means 30 to the empty capsule receiving holes 28 in the wheel 24. This phase takes place in the first 36° of rotation of the cams 74 and 98. During this period, the cam 74 causes movement of the shoe 48 along with the movement of wheel 24 with the discharge openings of tubes 51 of the conduit means 30 and the holes 28 being maintained in alignment. Also during this period, the cam 98 actuates the arm 80, by way of roller 94 and arm 92, to move in the counterclockwise direction, during which time the holding blade 84 is moved away from the capsules in the discharge tubes 51 to free them and allow them to drop downwardly into the capsule receiving openings 28. Also during this period, the vacuum means is turned on and a vacuum is applied through the air manifold 102 and the bores 104 and ports 106 to the lower end of the capsule receiving openings 28 of the rotating wheel 24. This application of a vacuum pressure serves to assist the dropping of the capsules downwardly.

Thus, during the transfer period all 10 of the empty capsule receiving holes 28 have been filled with a capsule which takes a position as is shown in FIG. 4. The vacuum is turned off during the remainder of the rotation of the cam shaft 100. Also, at the end of the first 36° period of revolution, the gate means has been returned to its capsule holding position so that the next successive capsules which have dropped downwardly to the discharge end of the conduit means, where they are held initially by the capsule therebeneath in the hole 28, are subsequently held therein by the gate means during the remainder of the cam shaft revolution. Also during the remainder of the cam shaft revolution the shoe 48 is returned to the zero position in the manner shown schematically in FIG. 7, the shoe 48 being maintained in its forward position for a period of 50° and then gradually returned during a period of 168° to the zero position.

Also, during the remainder of the cam shaft revolution, the next successive 10 empty holes 28 have been moved to the transfer position beneath the discharge tubes 51 of the conduits 30.

It will thus be apparent that the parts are now in position for a subsequent cycle of operation. Each cycle of operation is identical to that described above and during each revolution of the cam shaft 100, 10 capsules are fed into 10 capsules receiving holes 28 in the wheel 24.

It will be apparent that the feeding apparatus in accordance with the invention achieves a very rapid feed of the capsules into the rotating wheel 24 so that a very high production rate may be achieved.

Moreover, it will be apparent that the timing of the gate means need not be as critical as those gate means requiring a complete cutoff of the discharge opening of the conduit means. Accordingly, it is much easier to provide an effective control of this gate means and there is less danger that the gate means will not close off the discharge opening as desired.

It will be apparent that various changes may be made in the construction of the arrangement of parts of the apparatus in accordance without departing it from the scope of the invention wherefore it is not desired to be limited except as set forth in the claims.

I claim:

1. In a capsule feeding apparatus, means for supplying a plurality of capsules in end-to-end relation, a rotating, disc-shaped wheel having a plurality of capsule receiving holes arranged in a circumferentially spaced annular array, and means for feeding capsules from said supply to said capsule receiving holes, said capsule feeding means including at least one flexible, upstanding conduit means for guiding said capsules for movement in end-to-end relation therethrough, said conduit means having a capsule receiving portion positioned in fixed relation adjacent said capsule supply means for receiving capsules therefrom, and a capsule discharge portion positioned above said rotating wheel in alignment with the path of movement of said capsule receiving holes as said wheel rotates, said capsule discharge portion of said conduit being mounted for movement along said path of movement of said capsule receiving holes, oscillating means for moving said capsule discharge portion of said conduit means along with said rotating wheel and in alignment with a capsule receiving opening during a portion of the cycle of operation of said oscillating means, gate means for controlling the movement of capsules from said discharge portion of said conduit to said capsule receiving holes, and means for actuating said gate means to permit a capsule to move from said conduit means to a capsule receiving hole when said capsule discharge portion is moving along with said rotating wheel.

2. In a capsule feeding apparatus according to claim 1 wherein there are provided a plurality of said conduit means in side-by-side relation for delivering a plurality of capsules to said capsule receiving holes.

3. In a capsule feeding apparatus according to claim 2 wherein said conduit means comprises a flexible tube connected between said fixed capsule receiving portion and said movable capsule discharging portion of said conduit means.

4. In a capsule feeding apparatus according to claim 2 wherein said gate means comprises a pivoted member biased against the side of a capsule located at said discharge portion of said conduit means, and said gate means actuating means comprises cam-operated means for moving said pivoted member against said bias out of contact with said capsules.

5. In a capsule feeding apparatus according to claim 2 including means for applying a vacuum pressure to the lower ends of said capsule receiving holes as they pass said discharge portion of said conduit means.

6. In a capsule feeding apparatus according to claim 1 wherein said gate means comprises a pivoted member biased against the side of a capsule located at said discharge portion of said conduit means, and said gate means actuating means comprises means for moving said pivoted member against said bias out of contact with said capsules.

7. In a capsule feeding apparatus according to claim 1 including means for applying a vacuum pressure to the lower ends of said capsule receiving holes as they pass said discharge portion of said conduit means.

8. In a capsule feeding apparatus according to claim 1 wherein said conduit means comprises a flexible tube connected between said fixed capsule receiving portion and said movable capsule discharging portion of said conduit means.

9. In a capsule feeding apparatus according to claim 8 wherein said gate means comprises a pivoted member biased against the side of a capsule located at said discharge portion of said conduit means, and said gate means actuating means comprises means for moving said pivoted member against said bias out of contact with said capsules.

10. In a capsule feeding apparatus according to claim 9 including means for applying a vacuum pressure to the lower ends of said capsule receiving holes as they pass said discharge portion of said conduit means.